United States Patent [19]

Smith

[11] Patent Number: 5,355,968
[45] Date of Patent: Oct. 18, 1994

[54] TOOL JOINT STRESS RELIEF GROOVE

[75] Inventor: Jackie E. Smith, Houston, Tex.

[73] Assignee: Grant TFW, Inc., Houston, Tex.

[21] Appl. No.: 64,858

[22] Filed: May 20, 1993

[51] Int. Cl.$^5$ .................. E21B 17/042; E21B 17/20; F16L 15/00

[52] U.S. Cl. ..................... 175/320; 285/114

[58] Field of Search ............... 175/320, 323; 166/242; 285/333, 332, 332.1, 114; 403/41, 343

[56] References Cited

U.S. PATENT DOCUMENTS

| | | | |
|---|---|---|---|
| 2,205,697 | 6/1940 | Scharpenberg | 285/333 X |
| 2,676,820 | 4/1954 | Boice | 285/333 X |
| 3,152,458 | 10/1964 | Simonin | 175/320 X |
| 3,730,286 | 5/1973 | Weiner | 175/320 |
| 4,076,436 | 2/1978 | Slator et al. | 285/333 X |
| 4,892,337 | 1/1990 | Gunderson et al. | 285/333 |

FOREIGN PATENT DOCUMENTS 1317815  1/1963  France .................. 175/320

OTHER PUBLICATIONS

G. E. Wilson, "A New Tool Joint Design Increases the Fatigue Life of Drillpipe Tubes." Publication of paper presented at SPE/IADC Drilling Conference, Amsterdam, Feb. 23-25, 1993, pp. 893-898.

Primary Examiner—Stephen J. Novosad
Attorney, Agent, or Firm—Browning, Bushman, Anderson & Brookhart

[57] ABSTRACT

A pipe body is provided having an upset portion and connecting to a tool joint to form a relatively rigid region. A stress relief groove is provided in this relatively rigid region of the tubular member to limit stress applied in the pipe body adjacent the upset portion by rotation of the pipe while the pipe is in an arcuate portion of a well bore. The stress relief groove is designed to increase flexibility of this relatively rigid region while providing that the anticipated stress to be applied in the relatively rigid section is less than the endurance limit in the locus of the stress relief groove.

14 Claims, 1 Drawing Sheet

TOOL JOINT STRESS RELIEF GROOVE

BACKGROUND OF THE INVENTION

1. Field of the Invention

The present invention relates to an improved tubular pipe and, more specifically, to a tool joint stress relief groove.

2. Description of the Background

Tubular goods such as drill pipe normally comprise pin and box tool joints welded to opposite sides of a pipe body. An upset region of increased wall thickness is typically provided on each side of the drill pipe body to allow a strong weld between the drill pipe body and the two tool joints. Due to the differences in these parts of the drill pipe as discussed hereinafter, stresses created by drilling tend to be non-uniform over the length of the drill pipe.

When drilling through a deviated or arcuate wellbore, the drill string formed by many individual drill pipes normally conforms to the arcuate contour of the well bore by bending accordingly. The stresses induced in each drill pipe by such bending are typically well below the yield strength of the pipe. However, when the drill pipes are rotated for rotary drilling while held in a bent position by the arcuate well bore, the stress becomes cyclical and fatigue failure may occur. Such a failure may cause the drill string to part. If the drill string parts, drilling must stop for a considerable time until the lost portion of pipe is fished out of the well bore and the integrity of the remaining drill pipe is checked. The more arcuate the well bore, the greater will be the cyclical stress on the drill pipe. Furthermore, fishing operations may become difficult in a highly deviated hole. Thus, there is an increased risk of losing the well and also the remainder of the expensive drill string in such highly deviated wells i.e. those wells in which fatigue failure is most likely to occur.

Due to discontinuities in wall thickness of the pipe, the stress created in a drill pipe due to bending in conformance with the well bore is not normally uniform along the entire length of the drill pipe. If failure occurs, the pipe is most likely to fail at the place in the drill pipe which experiences the most cyclically applied stress. In many cases, that place is the juncture of the normally substantially regular drill pipe body and the upset region. In this region, the wall thickness of the pipe is increased to form the upset portion by either a change in outside diameter, inside diameter, or both. The increased wall thickness permits a strong weld between the pipe body and the tool joint. The upset portion of tin e pipe with thicker walls is less likely to bend to match the shape of the arcuate well bore. Thus, the portion of the pipe with relatively thinner walls, especially that portion near the upset, may bend more than other parts of the drill pipe in order for the drill pipe to conform to the well bore. Since this portion of the pipe may experience significantly greater stress than other portions of the pipe, the stress created thereby may be near or above the pipe's endurance limit as discussed hereinafter even though it is below the yield strength of the pipe. Thus, rotation of the drill pipe may cause premature failure at this portion of the pipe.

Because of the significant time loss and cost involved whenever the drill string parts, a long felt need exists in the industry for a solution to failure caused in drill pipes due to cyclically applied stresses. Those skilled in the art will appreciate the present invention which substantially alleviates this problem.

SUMMARY OF THE INVENTION

The present invention provides for a tubular member comprising a pipe body having an upset portion in the end of the pipe body. The upset portion has a first thick walled region. The wall thickness of the first thick walled region is greater than the wall thickness of the pipe body adjacent the upset portion. A tool joint is provided which has an axially threaded end and a second thick walled region axially displaced from the threaded end. The thick walled region has a wall thickness greater than the wall thickness of the pipe body adjacent the upset portion. A typically welded connection between the first and second thick walled regions forms a rigid section of the tubular member. The rigid section has an annular stress relief groove disposed therein to increase the flexibility of the rigid section. The annular stress relief groove is profiled to provide a decreased wall thickness to increase flexibility of the rigid section and still have an endurance limit greater than an anticipated stress to be applied to the rigid section.

An object of the present invention is to provide an improved and more reliable drill pipe.

Another object of the present invention is a drill pipe that resists failure from fatigue around the juncture of the drill pipe body and the upset.

A feature of the present invention is a stress relief groove in the tool joint that reduces stress at the juncture between the upset and the tool body.

An advantage of the present invention is provision for a relatively inexpensive manufacturing modification that greatly reduces fatigue failure in drill pipe.

These and other objects, features, and advantages of the present invention will become apparent from the drawings, the descriptions given herein, and the appended claims.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DETAILED DESCRIPTION OF THE PREFERRED EMBODIMENT

The present invention provides for an improved tubular pipe that reduces cyclical stresses which may arise, for instance, by rotary drilling through an arcuate borehole. The greater the bend, deviation, or dogleg in the borehole, the greater will be the cyclical stress applied to the drill pipe as the pipe is rotated.

Figure 1:
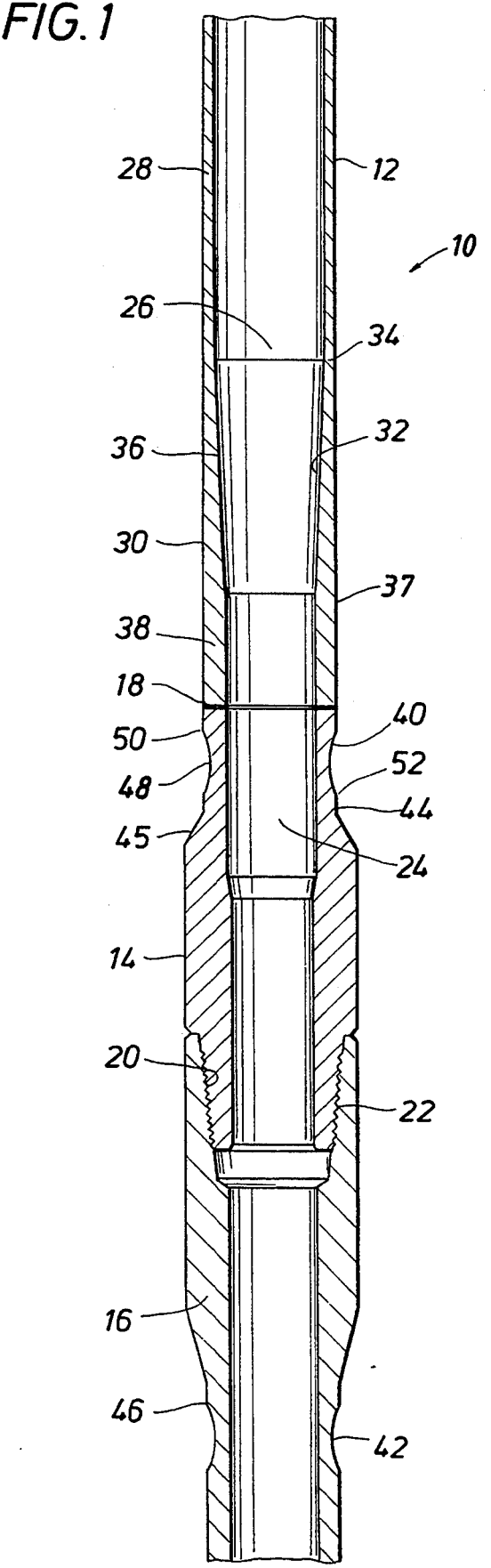
FIG. 1 is an elevational view, partially in section, of a drill pipe with a stress relief groove in accordance with the present invention.

Referring now to FIG. 1, there is shown a tubular pipe 10 having pipe body 12 and pin tool joint 14 interconnecting to box tool joint 16. Pipe body 12 is connected to pin tool joint 14 through weld 18. Pin threads 20 engage box threads 22 to interconnect pin tool joint 14 and box tool joint 16. Bore 24 extends through tubular pipe 10 along pipe axis 26. However, it is to be noted that it is not necessary that a bore extend through the present invention. For instance, the tool joints may have a substantially solid portion.

Pipe body 12 generally has a substantially constant wall thickness 28 over its length. In some instances, pipe body 12 may have fluting or spiralling grooves to avoid differential sticking but the wall thickness still remains relatively constant on an average basis. At the end portion 30 of pipe body 12, an upset region 36 is formed that extends to weld 18. The upset region 36 includes a generally frustoconical interior wall 32 with gradually increasing wall thickness beginning approximately at transition point 34 and extending to transition point 37. Although in this case the upset is internally defined by wall 32, the upset region may be internal or external or both. The length of frustoconical wall 32 may range from approximately 1 inch up to 10 inches. The shorter frustoconical sections are generally approximately 1½ inches in length and have a tapering but relatively abrupt change in wall thickness. The longer frustoconical sections are generally in the range of six inches for a more gradual change in wall thickness. After transition point 36, tool body 12 is substantially cylindrical but has an increased wall thickness 38 up to weld 18. The increased wall thickness at 38 is necessary to provide a strong weld 18. Thus, the wall thickness increases substantially from wall thickness 28 beginning at transition point 34.

Typically, the overall wall thickness between transition point 34 and a similar transition point at the juncture of the upset region and pipe body in the next drill pipe (not shown) is substantially greater than the wall thickness at point 34. Thus, the pipe does not bend as much or is stiffer over that length. The region around transition point 34 may necessarily bend an extra amount to compensate for this stiffness or rigidity in that region of the pipe connection. The stresses in the region of transition point 34 may be significant if the pipe is continually rotating in a dog leg portion, or relatively highly deviated portion, of the well bore for rotary drilling purposes.

Thus, bending is most often damaging to the pipe near the tool joint at the juncture of pipe body 12 and upset region 36 in the locus of transition point 34. To reduce the stress applied to the region around transition point 34, it is necessary to reduce the rigidity of the upset or the rigidity of the tool joint. In accordance with this purpose, annular stress relief grooves 40 and 42 ave disposed into pin and box tool joints 14 and 16 in the presently preferred embodiment. The grooves are preferably circular rather than, for instance, helical or spiralling due primarily to limited available axial space in the general joint area beginning at transition point 34. The stress relief grooves are profiled to relieve or reduce the stress in the locus of transition point 34 by reducing the rigidity of the upset and tool joint.

More specifically in the presently preferred embodiment, annular stress relief grooves 40 and 42 are formed in weld necks 44 and 46, respectively. The weld necks are generally cylindrically shaped with a relatively thick wall diameter except for the stress relief grooves. The thick wall diameter provides support for a strong weld 18. Weld neck 44 begins at generally frustoconical elevator shoulder 45. It should be noted that while this is a presently preferred embodiment, it is not required to have a decreased diameter weld neck beginning at elevator shoulder 45. For instance, the outer diameter of pin tool joint 14 could be fairly constant across its length except for axial disposed threads 20. However in the presently preferred embodiment, weld neck 44 has a reduced diameter as compared to the remainder of pin tool joint 14 and a fairly constant wall thickness up :to groove 40. After groove 40, the wall thickness of the generally cylindrical weld neck 44 of pin tool joint 14 remains constant until reaching weld 18. The weld neck of the presently preferred embodiment may have an increased length as compared to a standard weld neck to provide additional axial room for the groove. A few inches will normally suffice for the increase in length. Weld neck 46 of box tool joint 16 is similar to that of weld neck 44. The wall thickness of tool joint 14 at the juncture formed by weld 18 may be same as the wall thickness of pipe body 12 at the weld juncture. Alternatively, the wall thickness of tool joint 14 may be greater than the wall thickness of pipe body 12 at the weld 18. In either case, the wall thickness at the junctures of both tool joint 14 and pipe body 12 will be greater than the wall thickness of pipe body 12 such as wall thickness 28 or adjacent upset 36 in the locus of transition point 34.

The depth of the stress relief grooves is coordinated with the metallic strength and thickness of the weld neck to ensure that the bending stresses produced therein will be less than the endurance limit of the tool joint weld neck. The endurance limit for a body is defined as the stress limit or amount of stress below which fatigue failure will not occur in the body. Thus, continual flexing may occur below the endurance stress limit indefinitely and fatigue failure at the stress relief groove will not occur. The cross-sectional volume of metal defined by the stress relief groove should be sufficient to have a endurance limit above the anticipated stress applied to the pipe in the locus of the stress relief groove. The endurance limit, anticipated stress, and desired flexibility can be calculated by those skilled in the art. Such calculations may derive from a number of variables that become more or less important depending on the particular application or specification.

Since the bending stress at the juncture of the pipe body and upset such as in locus of point 34 can be reduced if the rigidity of the upset region 36 or tool joint weld neck 48 can be reduced, the groove may also or in addition be disposed at some point in the upset region preferably far enough away from the weld to avoid reducing the strength of the weld as desired. However, the presently preferred embodiment would have the groove in the weld neck as described hereinbefore. The groove is preferably not disposed within the weld because such disposition would weaken the strength of the weld.

Figure 2:
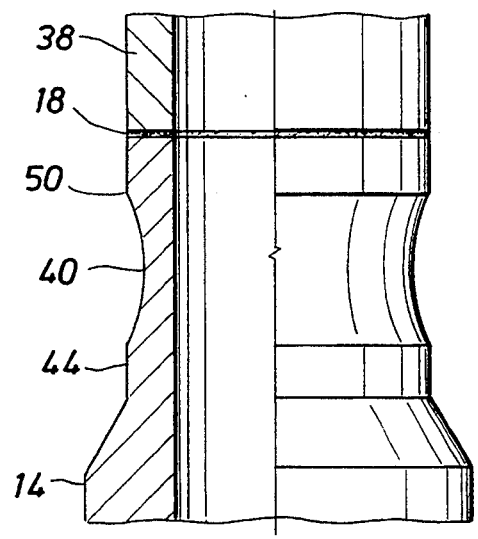
FIG. 2 is an elevational view, partially in section, showing an enlarged view of a stress relief groove in accord with the present invention.

Although the groove shown has a circular or arc shaped cross-section, the groove cross-section could have other shapes. Preferably the groove will produce a smooth, slow change in wall thickness moving axially through the weld neck. Abrupt or rapid changes in wall thickness increase stress. Thus, a square cross-section would increase the stress experienced. While a square, rectangular, or straight sided cross section for a relief groove is feasible, it is not the presently preferred embodiment due to the stresses that would result therefrom. As shown, stress relief groove 40 includes first edge 50 and second edge 52 on the opposite side of groove 40. First and second edges 50 and 52 may be rounded as desired to limit stress. The wall thickness decreases from first edge 50 to a minimum wall thickness point 48. The wall thickness then increases until reaching second edge 52. As shown in FIG. 1 and FIG. 2, stress relief groove 40 has a smoothly rounded bottom portion in the locus of minimum wall thickness point 48 to prevent stress created by sharp changes. As shown in FIG. 1, groove 40 is considerably deeper than threads 20 or 22. The wall thickness of groove 40 at its minimum at point 48 is typically the smallest wall thickness portion of tool joint 14 except for the wall thickness at the end of threads 20 which may be smaller. The wall thickness of groove 40 at its minimum point 48 is greater than the wall thickness at transition point 34. While annular stress relief groove 40 is disposed externally upon tool joint 14, it could also be functional if installed internally along bore 24.

In operation, the stress relief groove such as grooves 40 and 42 are machined into tool joint weld necks 44 and 46 to provide a region of decreased rigidity between the tool joints and the non-upset portion of pipe body 12. The region of decreased rigidity allows bending to occur and thus reduces the bending that could occur in the locus of transition point 34 which is at the juncture of drill pipe upset region 36 and the non-upset portion of the drill pipe having generally wall thickness 28.

The bending stresses induced in stress relief grooves 40 and 42 are below the endurance limit of the respective tool joint weld necks and will not cause a fatigue failure. Those skilled in the art will calculate an anticipated stress which is expected to be applied to stress relief grooves 40 and 42. The anticipated stress must then be less than the endurance limit of in the locus of grooves 40 and 42. Sufficient metallic mass or wall thickness is required so the endurance limit is greater than the anticipated stress to be applied while still providing for sufficient flexibility in this region to relieve stress in the locus of transition point 34. In this way, the likelihood of pipe failure due to cyclically applied stress such as rotary drilling in a deviated will be significantly reduced.

The foregoing disclosure and description of the invention is merely illustrative and explanatory thereof, and it will appreciated by those skilled in the art, that various changes in the size, shape and materials as well as in the details of the illustrated construction or combinations of features of the various elements may be made without departing from the spirit of the invention.

What is claimed is:

1. A tubular member, comprising:
    a pipe body having an upset portion at the end of said pipe body, said upset portion including a first thick walled region having a wall thickness greater than the wall thickness of said pipe body adjacent said upset portion;
    a tool joint having a threaded end and a second, thick walled region axially displaced from said threaded end, said second thick Walled region having a wall thickness greater than the wall thickness of said pipe body adjacent said upset portion;
    a weld connection between said first and second thick walled regions forming a rigid section of said tubular member, said rigid section having an annular stress relief groove disposed therein axially displaced from said weld connection for increased flexibility of said rigid section, said annular stress relief groove being profiled so as to provide a reduction in wall thickness in the locus of said annular stress relief groove to allow said increased flexibility of said rigid section and sufficient wall thickness in the locus of said annular stress relief groove to provide that an anticipated stress to be applied to said rigid section is less than the endurance limit in the locus of said stress relief groove.

2. The tubular member of claim 1, wherein:
    said first and second thick walled regions terminate at said weld connection with respective wall thicknesses T1 and T2, said wall thicknesses T1 and T2 being greater than the wall thickness of said pipe body adjacent said upset portion.

3. The tubular member of claim 2, wherein:
    said wall thickness T2 is equal to said wall thickness T1.

4. The tubular member of claim 1, wherein: said annular stress relief groove has a smoothly arcuate cross-section.

5. The tubular member of claim 1, wherein:
    said annular stress relief groove forms a variation in wall thickness of said rigid section that smoothly decreases from a first edge of said annular stress relief groove to a minimum stress relief groove wall thickness portion at the bottom of said annular stress relief groove, said wall thickness then smoothly increases to a second edge of the groove opposite said first edge.

6. The tubular member of claim 5, wherein said first and second edges are rounded.

7. The tubular member of claim 1, wherein:
    said annular stress relief groove is disposed within ten inches of said weld connection.

8. The tubular member of claim 1, further comprising:
    a second tool joint having a threaded end portion and a weld neck portion distal said threaded end portion, said second tool joint having a second annular stress relief groove disposed within said second tool joint weld neck portion.

9. The tubular member of claim 8, wherein:
    said second tool joint forms a box connection to interconnect to said threaded end.

10. The tubular member of claim 1, wherein said upset portion further comprises:
    a tapering increase in wall thickness in said upset portion, said tapering increase having an axial length from approximately one to ten inches.

11. The tubular member of claim 1, wherein:
    said annular stress relief groove is profiled to have a portion with a smaller wall thickness than the remainder of said tool joint.

12. The tubular member of claim 1 wherein:
    said annular stress relief is profiled to have a portion with a smaller wall thickness than the remainder of said tool joint except for the tip of said axially threaded end.

13. The tubular member of claim 1, wherein:
    said annular stress relief groove is disposed on an external surface of said rigid section to form an externally disposed annular stress relief groove.

14. The tubular member of claim 1, further comprising:
    a frustoconical shoulder axially displaced from said threaded end to define a weld neck of reduced external diameter, said weld neck including at least a portion of said second thick walled region.

* * * * *

UNITED STATES PATENT AND TRADEMARK OFFICE
CERTIFICATE OF CORRECTION

PATENT NO. : 5,355,968
DATED : October 18, 1994
INVENTOR(S) : Jackie E. Smith

It is certified that error appears in the above-indentified patent and that said Letters Patent is hereby corrected as shown below:

In column 5, line 57, change "Walled" to --walled--.

Signed and Sealed this

Twenty-seventh Day of December, 1994

Attest:

BRUCE LEHMAN

*Attesting Officer*     *Commissioner of Patents and Trademarks*